United States Patent Office 2,997,191
Patented Aug. 22, 1961

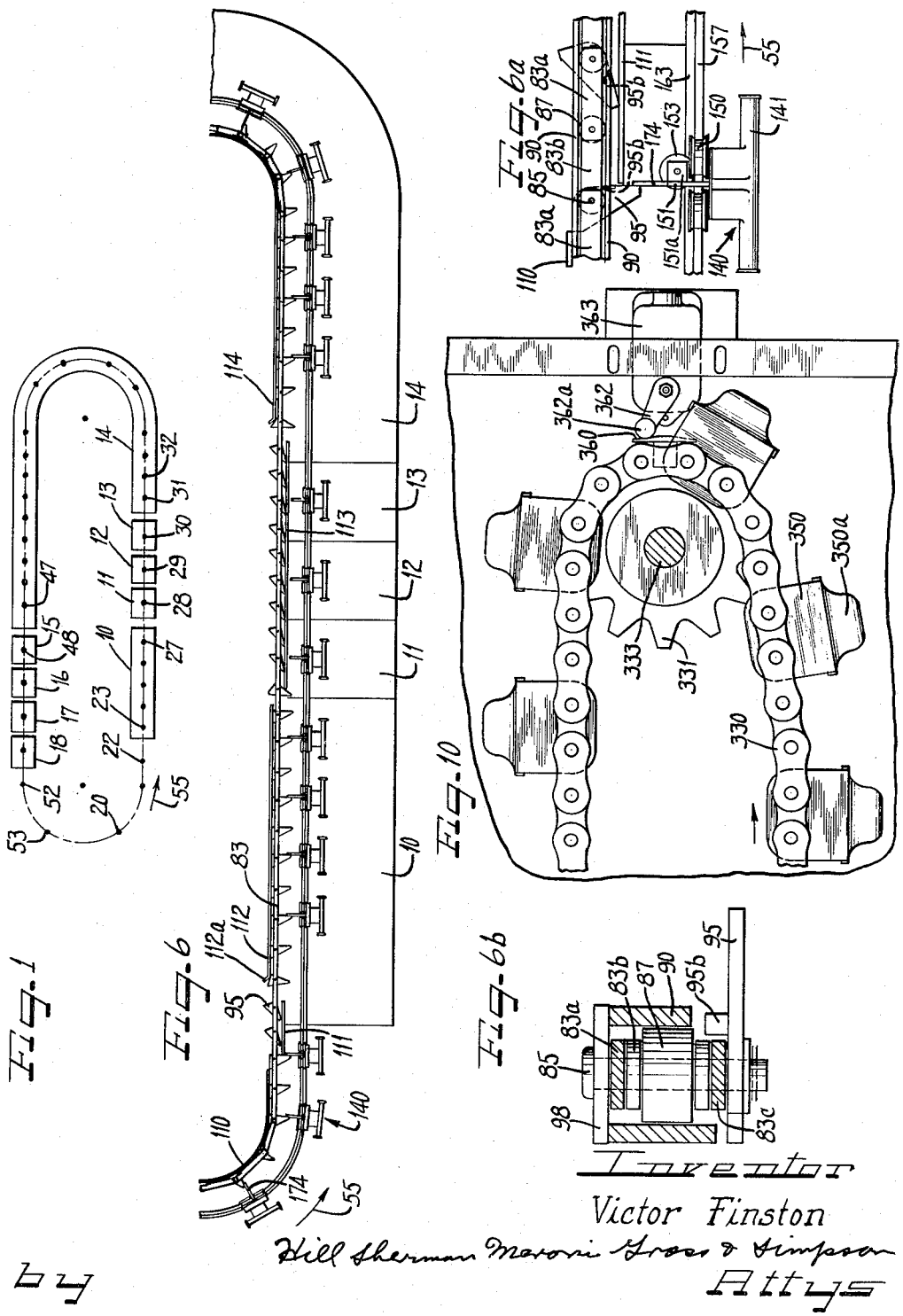

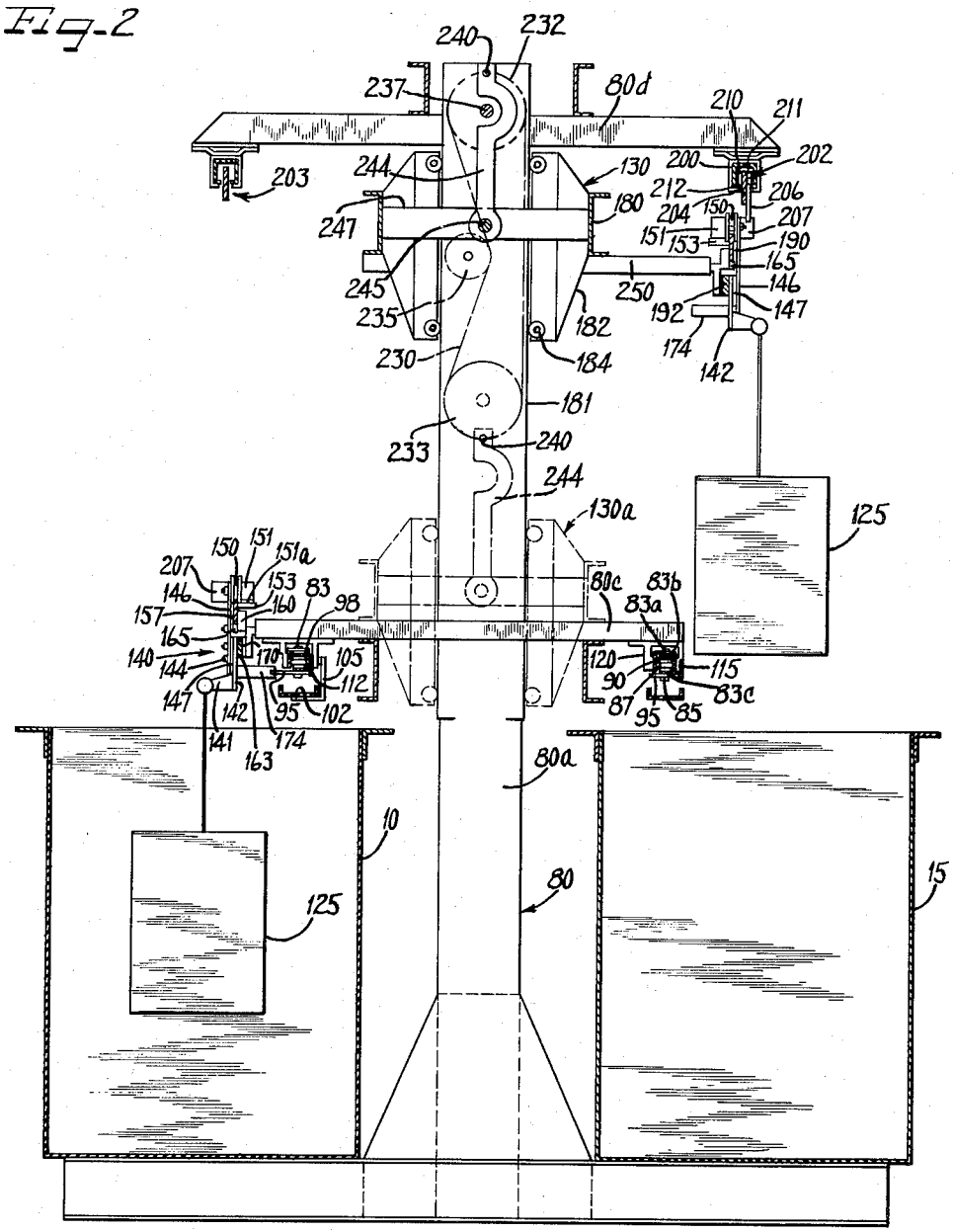

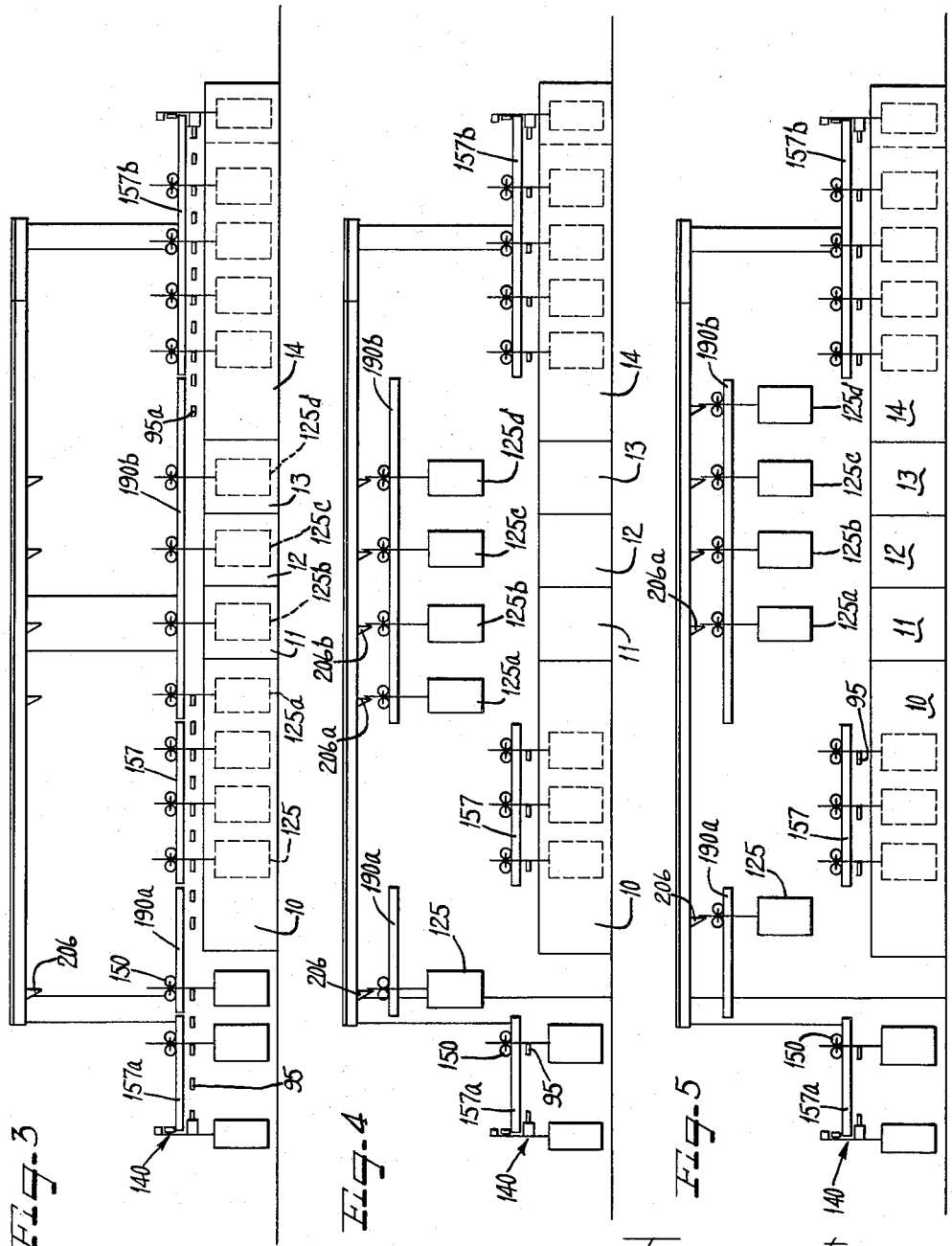

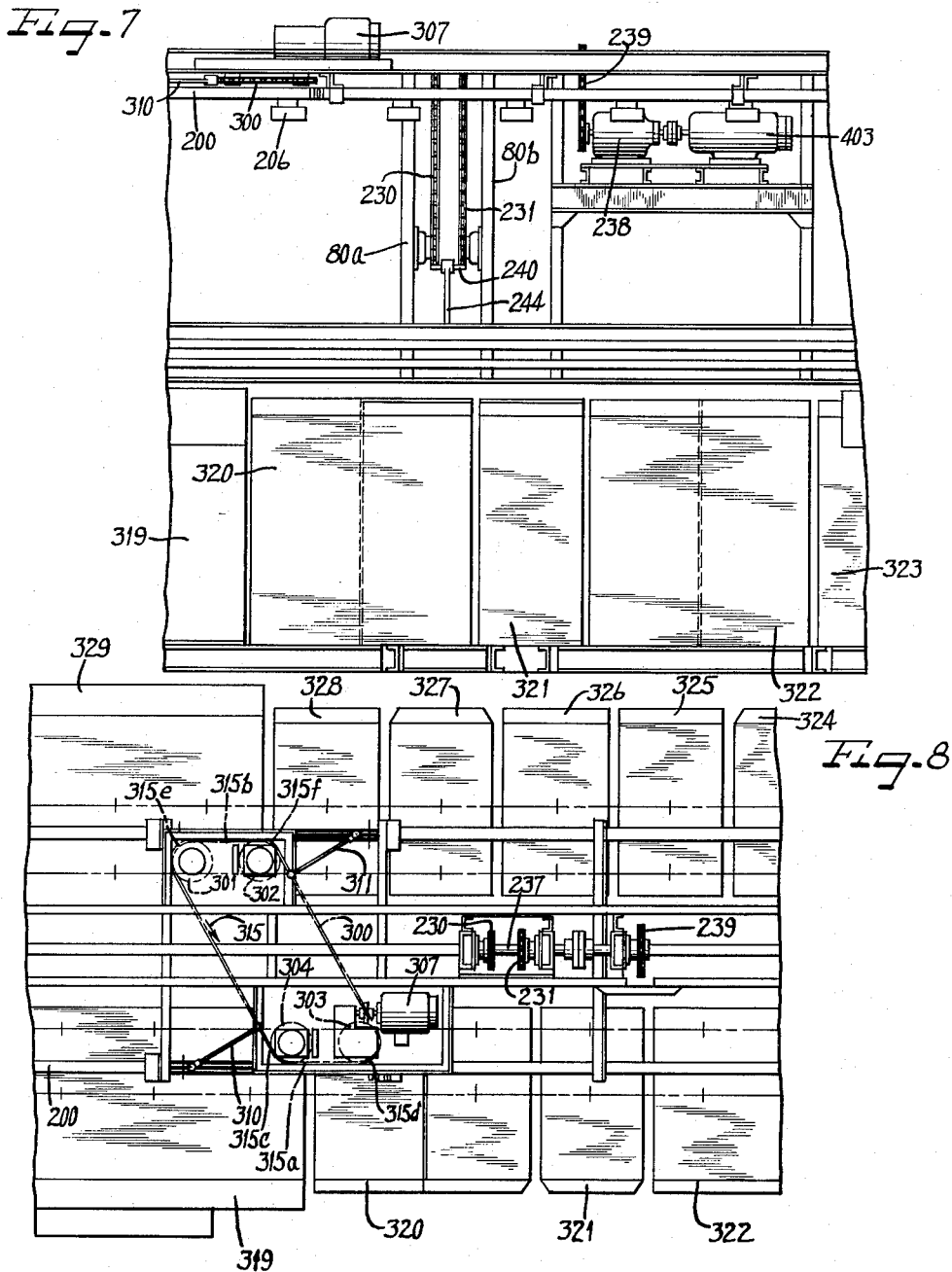

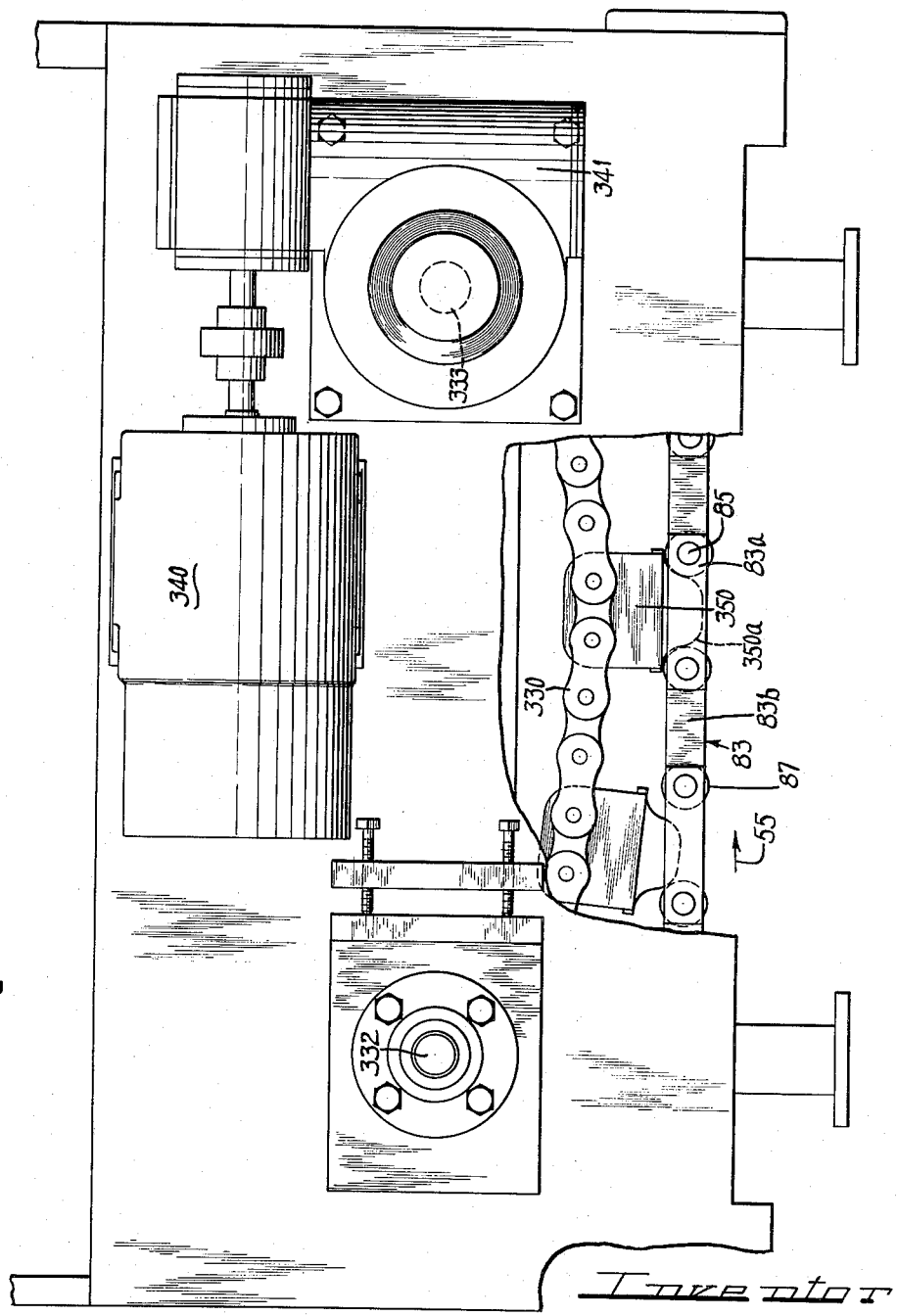

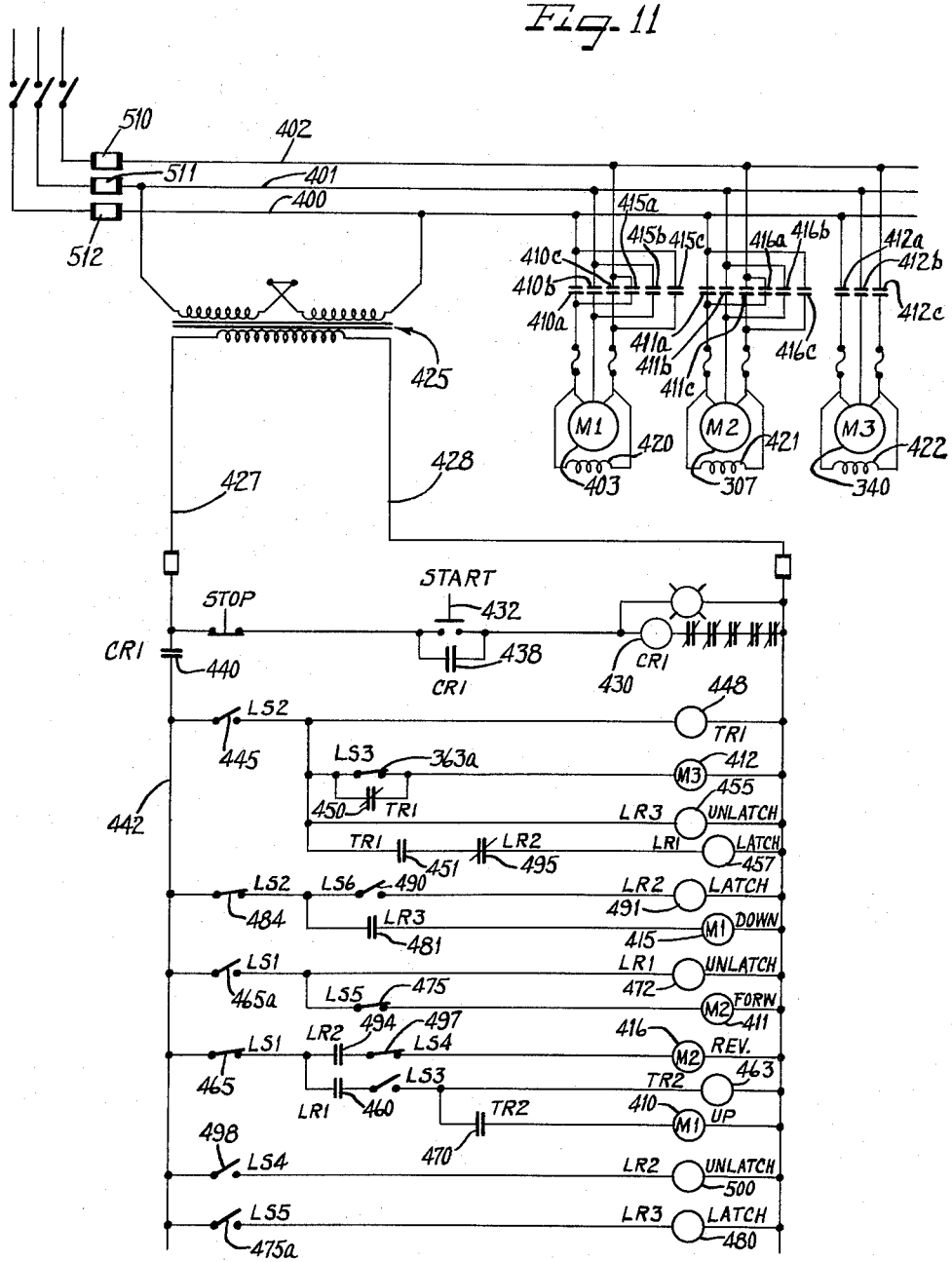

2,997,191
PROCESSING MACHINE
Victor Finston, Chicago, Ill., assignor to The Meaker Company, Chicago, Ill., a corporation of Illinois
Filed May 28, 1958, Ser. No. 738,377
6 Claims. (Cl. 214—89)

This invention relates to a processing machine and particularly to a loop type processing machine wherein a series of work carriers are moved in a closed circuit through a series of processing stations.

An important object of the invention is to provide a processing machine of the loop type having a lower conveyor operating at a fixed level in conjunction with means for clearing the conveyor of the path of work units being raised from associated processing stations.

Another important object of the invention is to provide a loop type processing machine accommodating work carriers of simple and economical construction.

A further object of the invention is to provide a novel conveyor system for a processing machine.

A still further object of the invention is to provide a novel and improved work carrier arrangement for a processing machine.

Yet another object of the invention is to provide improved conveyor and elevator drive system for a processing machine.

Other objects, features and advantages of the present invention will be apparent from the following detailed description taken in connection with the accompanying drawings, in which:

FIGURE 1 is a diagrammatic illustration of a typical loop type processing machine and illustrating the path of movement of work carriers through successive stations of the machine, stop positions of the work carriers being indicated by dots;

FIGURE 2 is a somewhat diagrammatic vertical cross sectional view of a loop type processing machine in accordance with the present invention;

FIGURE 3 is a diagrammatic side elevational view of a processing machine of the general type shown in FIGURES 1 and 2 and illustrating diagrammatically the positions of the work units with elevator in down position;

FIGURE 4 is a diagrammatic side elevational view similar to FIGURE 3 but illustrating the positions of work units with the elevator rails in raised position;

FIGURE 5 is a view similar to FIGURE 4 but illustrating the position of the work units after advance of the upper shuttle conveyor which is shown in retracted position in FIGURE 4;

FIGURE 6 (Sheet 1) is a diagrammatic fragmentary plan view of the processing machine illustrating the manner in which the pusher lugs of the lower conveyor bypass work carriers in the short dip tanks;

FIGURE 6a is a somewhat diagrammatic fragmentary plan view illustrating a portion of the structure of FIGURE 6 in greater detail;

FIGURE 6b is a fragmentary cross sectional view of the lower conveyor of FIGURES 6 and 6a illustrating certain details of construction thereof;

FIGURE 7 is a fragmentary somewhat diagrammatic side elevational view illustrating certain details of the elevator and upper shuttle drive mechanisms and showing a somewhat different arrangement of processing tanks;

FIGURE 8 is a fragmentary somewhat diagrammatic top plan view of the structure of FIGURE 7;

FIGURE 9 is a fragmentary somewhat diagrammatic top plan view illustrating the drive arrangement for the lower conveyor;

FIGURE 10 (Sheet 1) is a somewhat diagrammatic fragmentary top plan view illustrating certain details of the lower conveyor drive arrangement of FIGURE 9; and FIGURE 11 is a diagrammatic illustration of a suitable electrical control circuit for the illustrated processing machine.

As shown on the drawings:

FIGURE 1 illustrates diagrammatically a series of processing tanks 10—18 arranged in a loop for successively receiving work units. In this type of machine, work carriers may be circulated about the loop path through successive stop positions such as stop position 20 where the work carrier receives a work unit to be treated and stop position 53 where a treated work unit is removed from the carrier, the carriers progessing in the direction of the arrow 55 through the successive stop positions. A processing machine for progressing work through a loop series of processing stations of this general arrangement is described in my prior Patent No. 2,738,321, issued March 13, 1956.

A processing machine of this general type is also illustrated in my application for patent Serial No. 536,866, filed September 27, 1955, now Patent No. 2,869,560. The specific number and arrangement of tanks depends on the particular application of the machine, so that there is no intention to limit the present machine to any specific number or arrangement of treating stations.

In my previous Patent No. 2,299,618, issued October 20, 1942, there is disclosed a loop type processing machine wherein the work units are advanced in lower position by means of a continuous unidirectionally advancing chain and wherein the work units may be transferred between tanks a transfer distance substantially greater than the spacing of the work units within the long tanks of the processing machine. An objective of the present invention is to provide a processing machine having this general type of work movement and spacing, but wherein a simple lightweight carrier may be utilized in place of the relatively heavy and expensive side arm type carrier of my Patent No. 2,299,618.

FIGURE 2 illustrates a relatively detailed cross sectional view of an embodiment of the present invention whereby a relatively simple lightweight carrier construction may be advanced through a series of processing stations between the successive stop positions illustrated in FIGURE 1 and wherein the work carriers move a greater distance between successive tanks than the spacing of the work carriers within the long tanks of the machine. As seen in FIGURE 2, the illustrated embodiment comprises a central framework 80 extending within the loop arrangement of processing stations. The framework 80 may support a lower conveyor chain 83 which may extend in a continuous loop along the series of processing stations. The lower conveyor comprises a series of overlapping links such as indicated at 83a and 83b secured together by means of a vertical pin such as indicated at 85 which carries a roller 87 riding on track bars such as indicated at 90 fixed to the framework 80. By way of example, if the spacing between pins 85 of the lower conveyor chain is 4 inches, pusher bars such as indicated at 95 may be mounted on alternate pins 85 so as to have a spacing of 8 inches. The conveyor chain may be retained with the guide bars such as indicated at 90 by means of top plates such as indicated at 98 secured with the chain by means of the pins 85 at suitable intervals, the top plates 98 being in sliding engagement with the top edges of the bars such as indicated at 90 which define the path of the lower chain conveyor. Alternatively, each of the pins such as 85 may carry a pusher 95 depending upon the spacing between the work units along the processing path.

A drip pan 102 may be mounted beneath the conveyor chain by suitable brackets such as indicated at 105 to catch and contain any possible occasional oil drippage. As best seen in FIGURE 6, a series of pusher control bars 110—114 are operatively associated with the pushers 95 of the lower conveyor so as to maintain the pushers in an operative relation as they travel along the long tanks such as 10 in FIGURE 2 and to maintain the pushers in a retracted condition as they travel along the short tanks such as indicated at 11, 12 and 13. A pusher control bar 115 in FIGURE 2 supported from the frame 80 by means of a bracket 120 is similar in operation to the control bar 113 shown in FIGURE 6 and serves to retract the pusher lugs 95 associated therewith as shown in the right hand side of FIGURE 2 so as to clear the pusher lugs 95 of lugs 174 on the work carriers.

The work carrier illustrated in FIGURE 2 is designated generally by the reference numeral 140 and may comprise a work supporting arm 141 secured to a pair of vertical bars such as indicated at 142. Bolts such as indicated at 144 may secure the bars 142 to a plate 146 with insulation means such as indicated at 147 therebetween to insulate the bars 142 from the plate 146. The plate 146 may carry at its upper end a pair of rollers such as indicated 150 on opposite sides of a bracket 151 which may have a horizontal flange 151a carrying a further roller 153 which rotates on a vertical axis. The rollers 150 and 153 may ride on a rail section 157 mounted on the fixed framework 80 by means of a bracket 160 which also serves to support a cathode rail 163. Further rollers such as 165 are mounted on the plate 146 on opposite sides of the center line of the carrier and engage the lower edge of the rail section 157. These rollers 165 may engage the rail section 157 sufficiently tightly to prevent cocking of the work carrier away from the lower conveyor 83.

The arm 141 and bars 142 are of electrically conductive material and the bars 142 are in sliding contact with the cathode rail 163 so as to provide electrical continuity between the cathode rail and the work 125. The rail 163 is insulated from the bracket 160 as indicated at 170.

The pushers such as 95 on the lower conveyor 83 may engage lugs such as indicated at 174 which are secured to the vertical plate 146 and extend between the bars 142 to a point where they may be engaged by the extremities of the pushers 95 as indicated at the left in FIGURE 2.

As illustrated in FIGURE 2 the elevator frame 130 may comprise a series of longitudinally extending channels such as 180 mounted for vertical reciprocation on vertical trackways such as indicated at 181 by means of carriages such as 182 having rollers 184 riding on the trackways.

The elevator frame 130 carries movable rail sections such as indicated at 190 which form a continuous rail with fixed rail sections such as 157 in lower position of the elevator frame indicated in dot dash outline at 130a in FIGURE 2. The elevator frame also carries rail sections such as indicated at 192 for alignment with the rail sections 163 in lower position of the elevator frame to provide a continuous loop lower rail in lower position of the elevator frame.

As shown in FIGURE 2, the framework 80 may carry upper guideways such as indicated at 200 mounting horizontally reciprocal upper shuttles 202 and 203 comprising elongated shuttle bars such as indicated at 204 carrying pusher lugs such as 206 which engage lugs 207 extending from the carrier plates 146. The shuttle bars such as 204 may carry rollers such as indicated at 210 and 211 riding on flanges such as indicated at 212 of the guideways 200.

As seen in FIGURE 2, the elevator frame 130 may be raised and lowered by means of chains such as indicated at 230 extending over sprocket wheels 232 and 233 and engaging sprocket wheel 235 which is adjustable to adjust the tension of the chain between the sprockets 232 and 233. The sprocket 232 may be driven by a line shaft 237 from a suitable electric motor 403, drive transmission system 238 and chain 239 as shown in FIGURE 7. A pin 240 extends between a pair of chains 230 and 231 as best seen in FIGURE 7 and a link 244 is pivotally connected to the pin 240 and is pivotally connected by means of a pin 245 to crosspieces such as indicated at 247 secured to channels 180 of the elevator frame 130.

It will be observed that, because of the manner in which the link is coupled to the chain 230, the elevator will descend at its maximum rate for a major part of the distance but will decelerate as the pin 240 beings to move about the periphery of the sprocket wheel 233 until the elevator is descending with a minimum speed just prior to the time when the elevator reaches its lowermost position. Similarly when the direction of rotation of the line shaft 237 is reversed and the elevator frame is raised from its lower position it moves with a gradually increasing speed as the pin 240 travels about the sprocket wheel 233 and then ascends with its maximum speed until the pin 240 begins to travel about the periphery of the sprocket wheel 232 at which time the rate of ascent gradually decreases to zero. This type of motion of the elevator frame has been found to be advantageous in promoting a smooth operation of the machine and proper control of movement of the work units. It will be understood that the elevator chains and vertical guideways such as 181 may be provided at spaced intervals along the length of the machine and that the line shaft 237 may extend the length of the machine to drive the pairs of chains at each vertical column such as indicated schematically at 80a in FIGURE 2 and at 80a and 80b in FIGURE 7. It will also be appreciated that crosspieces such as indicated at 80c and 80d in FIGURE 2 and support pieces such as indicated at 250 of the elevator frame are disposed at suitable intervals along the length of the machine.

FIGURES 3, 4 and 5 illustrate the sequence of operation of the illustrated embodiment. It will be observed that in FIGURE 3 the lower rail comprises fixed sections 157, 157a and 157b and movable sections 190a and 190b corresponding to the rail section 157 and 190 illustrated in FIGURE 2. In FIGURES 3, 4 and 5, the work carriers are illustrated diagrammatically as comprising rollers 150 movable along the rail sections just described.

As previously mentioned, the lower conveyor pusher lugs 95 may be equally spaced along the lower conveyor chain, for example at 8 inch intervals. If the work units such as indicated at 125 are spaced 16 inches in the long tanks such as indicated at 10 and 14, then the work carriers will be engaged by alternate pusher lugs 95 along the chain at each of the long stations. Each of the pusher lugs which is in operative position is illustrated in FIGURE 3, but in FIGURES 4 and 5 only the pusher lugs actually in engagement with the work carriers are illustrated for simplicity.

In the illustrated embodiment, the transfer distance corresponding to the distance between stop positions such as 22 and 23, 27 and 28, 28 and 29, 30 and 31 in FIGURE 1 may be integral multiples of the spacing between successive pushers 95 on the lower conveyor. In such a case, the spacing between stop positions such as 27 and 31 in FIGURE 1 would be an integral multiple of the pusher spacing of the lower conveyor chain. Thus, the transfer distances may equal 24 inches where the pusher lugs 95 are at 8 inch intervals. The pushers 206 on the upper shuttle are spaced the transfer distance, for example 24 inches. If desired, the upper shuttle may have a stroke such that the pushers move 2 inches behind positions such as indicated at 27 in FIGURE 1. Also, the pusher stroke may be such as to move the work units in elevated position a distance slightly greater than the transfer distance, for example one inch and a half greater so that the total stroke of the upper shuttle might be 27½ inches, if desired, for a 24 inch spacing between successive pushers 206 on the upper shuttle. With this specific arrangement, stop position 28 would actually be 25½ inches from stop position 27, and stop position 31 where the work carrier is set down in the first position of the long tank 14 would actually be approximately 1½ inches ahead of the associated pusher on the lower conveyor indicated at 95a in FIGURE 3. With this specific arrangement, stop position 32 would be 14½ inches from stop position 31 while the remaining stop positions in the long tank 14 would be equally spaced at 16 inches. Thus in raised position of the elevator rails as illustrated in FIGURE 4, pusher lug 206a may be 2 inches behind the associated work carrier, while subsequent pusher lugs such as 206b may be 3½ inches behind the associated work carriers. Pusher lug 206a will then advance the associated work carrier 25½ inches, while pusher lugs such as 206b will advance their associated work carriers the transfer distance of 24 inches. Each of the work units 125a—125d in FIGURE 5 will have a spacing equal to the transfer distance upon full advance stroke of the upper shuttle. The upper pushers 206 may be fixed, since the upper shuttle may be retracted after lowering of the elevator rails from the position shown in FIGURE 5. With the elevator rails in lowered position, the lower conveyor is advanced a distance of 16 inches to place the work carriers in positions corresponding to those shown in FIGURE 3. The lower conveyor thus advances intermittently always in the forward direction in steps of 16 inches and alternately with the successive advances of the upper shuttle, so that the lower conveyor first advances, the elevator then raises, the upper shuttle advances, the elevator lowers, the upper shuttle retracts and more or less simultaneously the lower conveyor may again advance.

FIGURE 6 and 6a illustrate the manner in which the pusher lugs 95 on the lower conveyor chain pivot to inoperative position at points where the work carriers are not to be advanced in lower position thereof. Thus, control bar 111 serves to pivot the pushers to inoperative position at station 22 in FIGURE 1, while control bar 112 having angularly extending end portion 112a serves to pivot the pushers back to operative position at station 23. The pusher elements 95 may be provided with upstanding lugs as indicated at 95b which are adapted to engage chain link 83c seen in FIGURE 6b to limit pivoting of the pusher in the clockwise direction as viewed in FIGURE 6. Control bar 113 pivots the pushers to inoperative position prior to station 28 of tank 11 and maintains the pushers in inoperative position until they reach station 31 of tank 14. Similar control bars are provided at the opposite side of the processing machine. By way of example, the pusher bars may be pivoted to inoperative position at station 47 of tank 14 as seen in FIGURE 1 and be maintained in inoperative position until they reach station 52 shown in FIGURE 1. Alternatively, as illustrated in FIGURE 6, the pushers need not be moved to inoperative position until just prior to station 48 of tank 15, as illustrated with respect to station 28 of tank 11 in FIGURE 6.

FIGURE 8 illustrates the details of a preferred drive for the upper shuttle bars such as shown at 204 in FIGURE 2. The drive comprises a chain 300 extending around sprockets 301—304, sprocket 303 being driven through suitable gearing from an electrical motor 307. As seen in FIGURE 8, a pair of drive arms 310 and 311 are pivotally connected to the chain 300 and to the shuttle bars such as 204, so that as the chain 300 is moved in the direction of the arrow 315, the shuttle bars are first moved relatively slowly in the forward direction and then relatively rapidly as the portion of the chain 300 to which the arms 310 and 311 are connected travel around the sprockets 302 and 304 and begin to move between the sprockets 302 and 301, and 304 and 303, respectively in a direction substantially parallel to the direction of movement of the shuttle bars. By proper proportioning of the parts of the drive and proper arrangement of the sprocket wheels 301—304, the upper shuttle may be caused to advance relatively slowly as the pushers move into engagement with the work carriers, the shuttle thereafter being moved at the normal speed.

It may be noted that a different arrangement of tanks is shown in FIGURES 7 and 8 than is shown diagrammatically in FIGURE 1. The tanks in FIGURES 7 and 8 are designated by reference numerals 319—329.

FIGURES 9 and 10 illustrate the details of the drive for the lower conveyor chain designated generally by the reference numeral 83. The conveyor chain is driven by means of a booster chain 330 which extends in a loop about a pair of sprocket wheels such as shown at 331 in FIGURE 10 on shafts 332 and 333. The sprocket wheel 331 is driven by means of a motor 340 through a reducer mechanism 341 in an intermittent fashion. The chain 330 carries drive lugs 350 having teeth 350a which engage the main lower conveyor chain 83 to drive the lower conveyor. The booster chain 330 also carries cam plates such as indicated at 360 in FIGURE 10 for actuating limit switch arm 362 of limit switch 363. The cam actuating plates such as 360 are spaced along the booster chain 330 a distance corresponding to the center to center distance between work carriers in the long tanks, for example 16 inches in the specific embodiment referred to above. The actuating arm 362 may include a roller 362a as shown in FIGURE 10.

The electric circuit for controlling operation of the illustrated embodiment is shown in diagrammatic form in FIGURE 11. As there shown, three phase electric power may be supplied by lines 400, 401 and 402 to elevator motor 403, upper shuttle motor 307 and lower conveyor motor 340 under the control of forward relays 410, 411 and 412 and reverse relays 415 and 416, the lower conveyor motor 340 operating only in the forward direction. The motors 403, 307 and 340 are supplied with brakes including solenoids 420, 421 and 422 which apply a braking force to the motor shafts when the respective solenoids are deenergized, the brakes being released upon energization of the associated solenoids.

Single phase power is supplied by lines 400 and 401 via a transformer 425 to lines 427 and 428. When start button 432 is depressed, control relay CR1 is actuated by means of its actuating coil indicated diagrammatically at 430. Actuation of relay CR1 closes contacts 438 and contacts 440 supplying voltage to line 442. Elevator lower limit switch LS2 has its contact 445 closed when the elevator is in its lower position to energize coil 448 of timing relay TR1. At this time with the lower conveyor drive mechanism of FIGURE 10 in stop position, limit switch LS3 designated by the reference numeral 363 will have its contact 363a in open position. Forward relay 412 of lower conveyor motor 340 is energized through contacts 450 of timing relay 448 to begin movement of the lower conveyor. As soon as the cam plate 360 moves out of engagement with the actuating arm 362 in FIGURE 10, limit switch contact 363a will close to continue operation of the lower conveyor motor 340 after timer TR1 times out and opens contacts 450. When the lower conveyor has completed its forward advance, the next succeeding cam plate 360 on the booster chain 330 will actuate limit switch arm 362 to again open limit switch contact 363a of limit switch LS3. This will deenergize relay 412 and cause the brake of motor 340 to be applied stopping the lower conveyor.

During the time when the elevator is in down position and the limit switch contact 445 is closed, relay LR3 will be unlatched by means of unlatch coil 455, and when timing relay TR1 times out, contacts 451 will close to energize the latch coil 457 of relay LR1. When relay LR1 is latched, contacts 460 are closed to energize timing relay TR2 by means of its energizing coil 463 under the control of the elevator upper limit switch LS1 whose contact is indicated at 465. Timing relay TR2 controls the dwell period of the machine with the elevator in down position. When relay TR2 times out, contacts 470 thereof are closed to energize up relay 410 of elevator motor 403 causing the elevator to be raised, limit switch contact 465 of elevator upper limit switch LS1 opening when the elevator reaches upper position and contact 465a of limit switch LS1 closing to unlatch relay LR1 through unlatch coil 472. Forward relay 411 of upper shuttle motor 307 is now energized under the control of upper shuttle forward position limit switch LS5 whose contact is designated 475 in FIGURE 11. When the upper shuttle reaches forward position, relay 411 is de-energized, and contact 475a of limit switch LS5 is closed to latch relay LR3 through latch coil 480 thereof.

Latching of relay LR3 closes its contact 481 to energize down relay 415 of elevator motor 403 to cause the elevator to move to down position under the control of elevator lower limit switch contact 484 of limit switch LS2. As previously described, when the elevator reaches lower position contact 445 of limit switch LS2 is closed unlatching relay LR3.

When the elevator was in upper position with the upper shuttle in its back position, contact 490 of return signal limit switch LS6 for the upper shuttle was closed to latch relay LR2 through its latch coil 491. With relay LR2 latched, its contacts 494 are closed and its contacts 495 are open. Thus, when the elevator leaves upper position elevator upper limit switch contact 465 closes to energize reverse relay 416 of the upper shuttle motor 307 to cause the upper shuttle to return under the control of upper shuttle reverse limit switch contact 497. When the upper shuttle is returned, contact 498 of the upper shuttle return limit switch is closed unlatching relay LR2 by means of its unlatch coil 500. The system is now ready for a further cycle when the elevator reaches lower position to close contact 445 of limit switch LS2. It will be understood that the limit switch LS6 may be arranged to be tripped after the elevator has lowered part way and is clear of the upper shuttle, so that the upper shuttle does not begin to return until the carriers on the elevator are clear of the upper shuttle pushers.

In the embodiment of FIGURE 11, relay 410 may control contacts 410a, b and c; relay 411, contacts 411a, b and c; relay 412, contacts 412a, b and c; relay 412, contacts 412a, b and c; relay 415, contacts 415a, b and c; and relay 416, contacts 416a, b and c.

The present invention thus comprises a series of processing tanks such as indicated at 10—18 in FIGURE 1 arranged in a loop with a framework as indicated at 80 extending centrally of the loop for substantially the length thereof, with a lower unidirectional conveyor as indicated at 83 in FIGURE 6 extending in a closed loop horizontally inwardly of the stations occupied by the work units 125 in the tanks as seen in FIGURE 2. As illustrated in FIGURE 2 at the left hand side, the vertical path of the work units 125 as they are raised from the processing tanks are horizontally displaced from the horizontally outer extremities of the pusher lugs 95 so as to clear the work units indicated diagrammatically at 125 of the pusher lugs 95 on the lower conveyor. The work carriers are provided with engagement means or lugs such as indicated at 174 in FIGURE 2 extending into engageable relation with the pusher lugs 95 in operative position of the pusher lugs as indicated at the left side in FIGURE 2. Stations such as indicated at 22, 23, 27, 28, 29, 30, 31, 47, 48 and 52 in FIGURE 1 may be designated transfer stations since the work units move along a vertical path in arriving at and/or departing from such stations.

As illustrated in FIGURE 6, means are provided for disabling the pushers 95 by moving the same to inoperative position out of engageable relation to the lugs 174 at stations such as indicated at 28, 29 and 30 in FIGURE 1 so as to allow the work carriers to remain at these stations during advance of the lower conveyor.

Referring to FIGURE 8, it will be observed that the loop chain 300 driving the upper shuttle conveyors travels in a loop path including length portions such as indicated at 315a and 315b extending generally along the path of travel of the upper shuttle means indicated generally at 202 and 203 in FIGURE 2. The chain 300 also includes length portions such as indicated at 315c, d, e, f which extend generally horizontally inwardly from the length portions 315a and 315b respectively to provide for travel of the chain 300 having a lesser component in the direction of movement of the shuttles 202 and 203 so as to tend to provide a gradual deceleration in the velocity of the shuttles near the respective ends of their strokes. The arms 310 and 311 are preferably coupled to portions of the loop chain 300 which travel along length portions 315c, 315a, 315d, and 315f, 315b and 315e, respectively, during energization of the drive means 307 in a given direction.

Summary of operation

In operation of the machine, work units may be loaded on the carriers such as indicated at 140 in FIGURES 2 and 6 at station 20 indicated diagrammatically in FIGURE 1. The work carriers are advanced between the successive stations indicated by dots in FIGURE 1. In lower position, the work carriers travel on track sections such as indicated at 157 and 163 in FIGURE 2 under the impetus of the lower unidirectional loop chain conveyor 83 having pivotal pusher lugs such as indicated at 95. Safety means may be provided as indicated at 111 in FIGURE 6 for pivoting the pusher lugs 95 out of operative relation at stations such as indicated at 22 in FIGURE 1, so as to prevent movement of the work units against the ends of the tank such as indicated at 10 in case of malfunctioning of the machine. In proper operation of the lower conveyor, the conveyor will be stopped with work carriers at positions such as 22 and 27 until the elevator indicated generally at 130 in FIGURE 2 raises the work units above the tanks such as 10. Thus, means such as indicated at 111 are provided purely as a safety feature and are optional. On the other hand, pusher lug control bar 113 shown in FIGURE 6 provides a necessary function in pivoting the pusher lugs out of engageable relation to the engagement means or lugs 174 on the work carriers 140, so that the work carriers will not be advanced in the single station tanks such as 11, 12 and 13.

Drive chain 300 shown in FIGURE 8 is energized from motor 307 to reciprocate the respective upper shuttles shown at 202 and 203 in FIGURE 2 to advance the work units between stations such as indicated at 22 and 23, 27 and 28, and 28 and 29 in FIGURE 1 in raised position of the elevator frame carrying tracks such as indicated at 190 and 192 as seen in FIGURE 2. The drive for the lower unidirectional loop chain conveyor is shown in FIGURES 9 and 10 having lugs such as indicated at 350 engaging between successive rollers 87 on the lower chain conveyor 83. A limit switch indicated at 363 in FIGURE 10 actuated by cam plates such as indicated at 360 carried at suitably spaced intervals on the booster chain 330 controls the intermittent advance of the lower chain conveyor in conjunction with lower conveyor motor relay coil 412 shown in FIGURE 11 and timing relay TR1 having energizing coil 448 which opens normally closed contacts 450 prior to the time when the lower conveyor has advanced one step, so that opening of contact 363a of limit switch 363 will deenergize relay 412 at the end of one unit advance of the lower conveyor. Reference numerals 510, 511 and 512 in FIGURE 11 designate suitable fuses.

The electric circuit of FIGURE 11 operates in such a manner that as indicated in FIGURES 3, 4 and 5, after an advance of the lower conveyor 83, elevator rails such as indicated at 190a, 190b in FIGURES 3–5 are raised by elevator chains 230 and 231 seen in FIGURES 2, 7 and 8. Thereafter, the upper shuttle is advanced to the position shown in FIGURE 5 and the elevator lowered. After the elevator lowers part way limit switch LS6 is tripped closing contact 490 and latching relay LR2 to energize reverse relay 416 of shuttle motor 307 to begin return stroke of the upper shuttle by means of chain 300 seen in FIGURE 8. When the elevator reaches lower position, limit switch LS2 is actuated to close contact 445 in FIGURE 11 energizing timing relay TR1 and actuating the control relay coil 412 for lower conveyor motor 340 to advance the work units from the position shown in FIGURE 5 to a position similar to that shown in FIGURE 3.

It will be apparent that many modifications and variations may be effected without departing from the scope of the novel concepts of the present invention.

I claim as my invention:

1. In a processing machine, a series of processing stations arranged in a loop, a framework centrally of said loop, a lower conveyor supported on said framework at a fixed lower level for horizontal movement about said loop to advance work carriers between certain of said processing stations, lower rail means for supporting work carriers in operative relation to said processing stations with work units supported from said work carriers at said processing stations including fixed lower rail sections carried on said framework and movable rail sections for lifting successive work carriers in transfer of the associated work units between other of said processing stations, elevator means mounted on said framework for vertical reciprocation and carrying said movable rail sections, and means for raising and lowering said elevator means to raise and lower work carriers and the work units supported therefrom along vertical transfer paths, said lower conveyor having engaging means engageable with work carriers on said lower rail means for advancing said work carriers between said certain of said processing stations and said engaging means being disposed horizontally inwardly of the vertical transfer paths of said work carriers and work units to provide lateral clearance for work carriers and work units raised by said elevator means from said other of said processing stations.

2. In a processing machine, a series of processing stations arranged in a loop, a framework centrally of said loop, a lower conveyor supported on said framework at a fixed lower level for horizontal movement about said loop to advance work carriers between certain of said processing stations, lower rail means for supporting work carriers in operative relation to said processing stations with work units supported from said work carriers at said processing stations including fixed lower rail sections carried on said framework and movable rail sections for lifting successive work carriers to an upper level in transfer of the associated work units between other of said processing stations, elevator means mounted on said framework for vertical reciprocation and carrying said movable rail sections, means for raising and lowering said elevator means to raise and lower work units supported from work carriers on said movable rail sections along vertical transfer paths, and means for disconnecting said lower conveyor from work carriers on said lower rail means at predetermined ones of said other processing stations for allowing the work carriers to remain at said predetermined ones of said other stations during advance of said lower conveyor.

3. In a processing machine, a series of processing stations arranged in a loop, a framework centrally of said loop, a lower conveyor supported on said framework for horizontal movement about said loop to advance work carriers between certain of said processing stations, lower rail means for supporting work carriers in operative relation to said processing stations with work units supported from said work carriers at said processing stations including fixed lower rail sections carried on said framework and movable rail sections for lifting successive work carriers in transfer of the associated work units between other of said processing stations, elevator means mounted on said framework for vertical reciprocation and carrying said movable rail sections, means for raising and lowering said elevator means to raise and lower work units supported from work carriers on said movable rail sections along vertical transfer paths, said lower conveyor having pushers projecting generally horizontally therefrom but terminating horizontally inwardly of the vertical transfer paths of the work units, and said work carriers having engagement means projecting horizontally inwardly into the path of said pushers for engaging said pushers to enable said lower conveyor to advance the work carriers along said lower track means.

4. In a processing machine, a series of processing stations arranged in a loop, a framework centrally of said loop, a lower conveyor supported on said framework at a fixed lower level for horizontal movement about said loop to advance work carriers between certain of said processing stations, lower rail means for supporting work carriers in operative relation to said processing stations with work units supported from said work carriers at said processing stations including fixed lower rail sections carried on said framework and movable rail sections for lifting successive work carriers to an upper level in transfer of the associated work units between other of said processing stations, elevator means mounted on said framework for vertical reciprocation and carrying said movable rail sections, means for raising and lowering said elevator means to raise and lower work units supported from work carriers on said movable rail sections along vertical transfer paths, said lower conveyor having pushers pivotally mounted thereon for movement therewith and engageable with work carriers on said lower rail means, and means for pivoting said pushers inwardly out of engageable relation to said work carriers at predetermined ones of said processing stations to allow work carriers to remain on said lower rail means at said predetermined ones of said processing stations during advance of said lower conveyor.

5. In a processing machine, a series of processing stations, a lower conveyor extending adjacent said processing stations, said lower conveyor having pusher means disposed thereon at predetermined equally spaced pusher positions, lower rail means for supporting work carriers in operative relation to said processing stations including a fixed lower rail section for supporting work carriers during advance thereof by said lower conveyor pushers between certain of said processing stations and a movable rail section for lifting successive work carriers in transferring work units thereof between other of said processing stations, elevator means mounted for vertical reciprocation and carrying said movable rail section, means for raising and lowering said elevator means to raise and lower work units supported from work carriers on said movable rail section, and upper conveyor means having pushers spaced therealong a distance equal to a multiple of the distance between pusher positions on the lower conveyor for moving work carriers along said movable rail section in upper position of said elevator means between said other of said processing stations.

6. In a processing machine, a series of processing stations arranged in a loop, a framework centrally of the loop, a lower conveyor supported on said framework and extending in a loop path adjacent said processing stations, said lower conveyor having pusher means disposed thereon at predetermined equally spaced pusher positions, lower rail means for supporting work carriers in operative relation to said processing stations including fixed lower rail sections carried on said framework for supporting work carriers in operative relation to said lower conveyor pusher means and movable rail sections for lifting successive work carriers in transferring work units thereof between certain of said processing stations, elevator means mounted on said framework for vertical reciprocation carrying said movable rail sections, means for raising and lowering said elevator means to raise and lower work units supported from work carriers on said movable rail sections, and upper conveyor means having pushers spaced therealong a distance equal to a multiple of the distance between pusher positions on the lower conveyor for advancing work carriers between said certain of said processing stations in upper position of said elevator means, said lower conveyor comprising a chain loop having a series of pivot pins disposed generally vertically, having lengths extending between the successive pins and said lower conveyor pusher means being mounted on said pins and extending generally horizontally therefrom into operative relation to work carriers on said lower rail sections.

References Cited in the file of this patent

UNITED STATES PATENTS

| | | |
|---|---|---|
| 120,043 | Crump | Oct. 17, 1871 |
| 1,634,038 | Owens | June 28, 1927 |
| 1,846,053 | Hannon | Feb. 23, 1932 |
| 1,970,447 | Finston | Aug. 14, 1934 |
| 2,023,668 | Daw | Dec. 10, 1935 |
| 2,048,937 | Larson | July 28, 1936 |
| 2,138,095 | Gordon | Nov. 29, 1938 |
| 2,479,322 | Davis | Aug. 16, 1949 |
| 2,626,621 | Curtis | Jan. 27, 1953 |
| 2,789,569 | Davis | Apr. 23, 1957 |